Dec. 17, 1935. W. SEXAUER 2,024,393
METHOD OF FREEING GASES FROM SULPHUR COMPOUNDS
Filed July 30, 1934
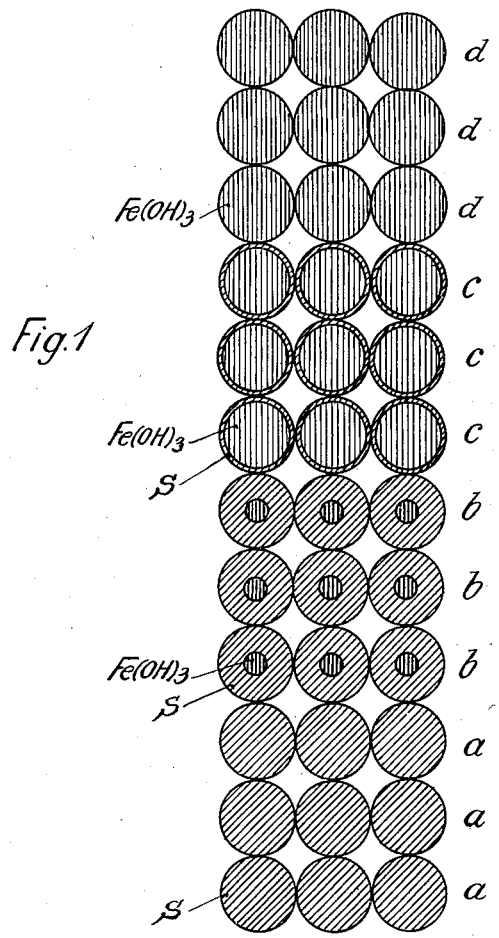
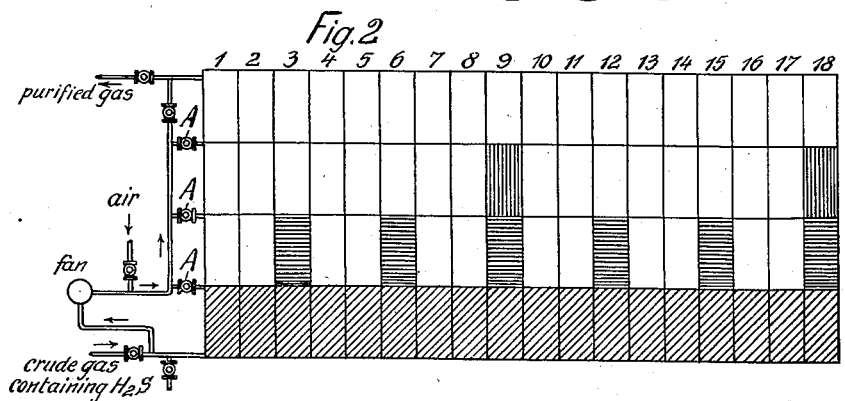
Inventor:
Walther Sexauer
by Karl Michaelis
Atty.

UNITED STATES PATENT OFFICE 2,024,393

METHOD OF FREEING GASES FROM SULPHUR COMPOUNDS

Walther Sexauer, Oberhausen, Germany, assignor to Gastechnik G. m. b. H., Oberhausen, Germany Application July 30, 1934, Serial No. 737,645
In Germany October 23, 1933

10 Claims. (Cl. 23—3)

The present invention relates to a method of freeing gases from sulphur compounds such as hydrogen sulphide or the like. It relates more particularly to the regeneration of the sulphur from masses serving for fixing the sulphur contained in the gases, such masses being known as gas purifying masses and containing mostly ferric hydroxide which is known to combine with sulphur under the formation of ferric sulphide, but can be regenerated by oxidation of the sulphide, elemental sulphur separating out.

The ferric hydroxide reacts with the gas containing hydrogen sulphide according to the equation

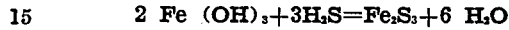

$$2\ Fe(OH)_3 + 3H_2S = Fe_2S_3 + 6\ H_2O$$

If the $Fe_2S_3$ formed in this reaction is treated with a gas, such as air, containing oxygen, regeneration of the mass occurs according to the equation

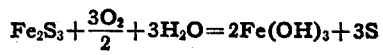

$$Fe_2S_3 + \frac{3O_2}{2} + 3H_2O = 2Fe(OH)_3 + 3S$$

Thus the ferric hydroxide is recovered and ready for the absorption of further quantities of hydrogen sulphide.

Recently the purification of gases containing sulphur compounds has been effected by means of purifying masses molded to form porous bodies, preferably balls, which are arranged either in a plurality of low receptacles arranged in series, or in high containers (towers) in which the absorbing balls are disposed in a high column. The gas containing the sulphur compounds is either conducted consecutively through all the receptacles of a series or made to ascend through the high column of purification bodies arranged in the towers. Regeneration of these molded masses was then effected in a well known manner either by adding air to the gas to be purified, while it passed through the porous bodies, or, by stopping the passage of fresh gas through these bodies and passing air therethrough either within or outside of the receptacles or towers.

When the molded purification masses were regenerated in this manner, it was found that in spite of their comparatively high contents of ferric hydroxide these bodies were not able to absorb sufficiently large quantities of sulphur. Thus for instance, when passing the gas to be purified through towers filled with molded bodies, the bottom layer of which is removed from time to time, whereupon a fresh layer of such porous bodies is placed on top of the column of purification bodies, the difficulty arose that after a certain period the quantity of sulphur contained in the removed bottom layer was found to be considerably lower than the percentage of sulphur contained in the bottom layers previously withdrawn. For instance if the purification bodies first withdrawn contained 45% sulphur, the bodies constituting the bottom layer, which was withdrawn after the tower had been under operation during several months, contained only 25% sulphur. I have found the cause for this phenomenon to be the following:

Since each purification body contains only a limited quantity of ferric hydroxide, it can only combine with a limited quantity of hydrogen sulphide, while the uncombined quantity of hydrogen sulphide must be absorbed by some other body still containing active ferric hydroxide. A purification body, all the ferric hydroxide in which has been converted into ferric sulphide, contains about 6% by weight sulphur. After regeneration, i. e. after the sulphide has been oxidized in contact with air or the like to regenerate ferric hydroxide, elemental sulphur being separated out in the body, this body will now absorb for instance another 6%, thus containing 12% sulphur in all. However in consequence of the separating out of elemental sulphur within the porous body, its capacity of absorbing hydrogen sulphide from the gas will be reduced since a considerable proportion of the active ferric hydroxide is enveloped by the sulphur which has separated out, and consequently during each purification period, when gas containing hydrogen sulphide is passed through the body, it will now absorb for instance only 4 thereafter only 3, then only 2 and finally only a fraction of a percent sulphur. Thus a purification body, in order to be saturated with 45% sulphur, will absorb for instance during 13 consecutive periods of purification (between which are inserted 12 regeneration treatments with air)

6%+6%+6%+6%+5%+5%+3%+3%+2%+
1%+1%+0.5%+0.5%=45% surphur

This body must now be removed from the tower or receptacle and the ferric hydroxide must be rendered accessible for the hydrogen sulphide by extracting the sulphur with a solvent, for instance carbon disulphide.

In the drawing affixed to this specification and forming part thereof.

Fig. 1 is a diagram illustrating the different phases of sulphur absorption and separation in a column of purification bodies, while Fig. 2 is a diagram illustrating by way of example the mode of purification of the gas and of regeneration of the purifying bodies according to the present invention.

As shown in a purely diagrammatic manner in Fig. 1, the bottom layer $a$ of a column of superposed ball-shaped purification bodies is saturated throughout with sulphur (S), which means that these bodies contain for instance 45% sulphur.

The three layers $b$ above the bodies $a$ are traversed by the sulphur containing gas which has already been deprived of most of its sulphur when passing through the layer $a$ and therefore only contains a small percentage of hydrogen sulphide. The outer layer or shell of the bodies $b$ suffices to bind the sulphur of this hydrogen sulphide and in consequence thereof the inner layer or core of the bodies $b$ is not or only incompletely converted into ferric sulphide.

In the layers of bodies $c$ arranged above the bodies $b$ still less ferric sulphide is formed, since here the gas passing through the bodies is still poorer in hydrogen sulphide.

If now all these superposed layers were regenerated by passing air therethrough, then the bottom layers $a$ containing bodies altogether saturated with sulphur would be regenerated completely and the elemental sulphur separating out in consequence of the oxidation of the ferric sulphide would be uniformly deposited throughout each body. In contradistinction thereto the purification bodies $b$ contain a core of ferric hydroxide free from sulphur which is surrounded by a dense sulphur shell formed in consequence of the many alternating sulphur absorptions and separations. This dense shell now prevents the gas from entering the body and consequently, if on withdrawal of the layers $a$ the layers $b$ descending by gravity now take their place on the bottom of the tower, where fresh gas containing a high percentage of hydrogen sulphide is admitted, they will not be traversed throughout by the gas and will therefore not be capable of absorbing the same proportion of sulphur. Thus these bodies, instead of absorbing 45% sulphur, will be capable only of absorbing for instance 35%.

The bodies in the layers $c$ would absorb still less sulphur for here the continuous alternation of the binding and separating out of sulphur brings about the formation of a very thin but also very dense sulphur shell, which envelops a large body of ferric hydroxide. When these bodies $c$ reach the bottom of the tower, they will only be able to absorb about 25% sulphur.

The above shows that the separation and particularly the frequent separation of sulphur (by regeneration with air) in an absorption body, before it has absorbed a sufficient percentage of sulphur, are at the root of the obnoxious formation of sulphur shells in such body.

Taking this fact into account, I now conduct the regeneration of the bodies of purification mass in such manner, that only those bodies are treated with air for regeneration, the entire contents of ferric hydroxide in which has been converted into ferric sulphide.

Depending on the kind of purification system in use my new process is carried out in one or the other manner. If the purification bodies are arranged in towers or other containers, in which the bodies gradually travel towards the point where the fresh gas enters, as described above, the bodies adjoining this point are regenerated (treated with oxidizing air) more frequently than the bodies disposed farther away from this point. I thereby obtain that practically only those bodies are regenerated which are completely saturated with sulphur and therefore contain only ferric sulphide, while the incompletely saturated bodies, which still contain a core of ferric hydroxide, are regenerated less frequently.

In the operation of my invention I prefer subdividing the column of purification bodies into a number of superposed sections and I now admit the air for regeneration to these sections according to a predetermined system which must be determined by experiment in certain intervals of time in accordance with the character and the sulphur contents of the gas.

As shown diagrammatically in Fig. 2, the figures 1 to 18 indicate the number of regeneration periods. In other words 18 operations of gas introduction have alternated with 18 introductions of air for regeneration. During this cycle now the air is not always admitted at the same level, but certain sections are treated more frequently than the others. Into the bottom section $a$ air is admitted continuously; into the section $b$ air is admitted only in the third, 6th, 9th, 12th, 15th and 18th regeneration periods, and it is then regenerated together with section $a$. Into section $c$ air is admitted only during the 9th and the 18th period of regeneration.

In the practical operation of this process certain changes may of course be made in this plan, provided only that care is taken to avoid a frequent air treatment unless the purification bodies are fully saturated with sulphur.

If the purification bodies are arranged in comparatively shallow layers in containers traversed by the gas in series, regeneration being effected by admixing air to the gas, I shift that container into which the fresh gas has been introduced and which consequently contains bodies saturated with sulphur throughout, to the end of the row or series and admix air for regeneration to the gas only at the inlet to this container. I thus avoid contact of the regeneration air with the incompletely saturated bodies in the second and third containers, which are traversed only by gas containing hydrogen sulphide, but practically free from oxygen.

In practicing my invention I may for instance proceed as follows:

*Example 1*

Assuming purification of the gas to be carried through in two towers, each 8 metres high and 4 metres in diameter, in which 100,000 cubic metres coke oven gas containing 12 grams hydrogen sulphide per cubic metre are purified per day, these towers are supplied alternately in a well known manner with the gas to be freed from sulphur and with air for regeneration, respectively. According to this invention regeneration is effected in this case as follows:—

The column, 8 metres high, of purification bodies arranged in each tower is subdivided into 4 superposed sections 1, 2, 3 and 4, each of which may be 2 metres high. At the top end of each section is provided a valve A for the air admission. After the bottom section 1 has been saturated throughout with hydrogen sulphide, the admission of gas to this tower is stopped and air is admitted into section 1, descending therein in order to reconstruct the ferric hydroxide in the purification bodies and to thus restore their capacity of absorbing hydrogen sulphide. When this has been effected, gas is once more introduced at the bottom of section 1 of this tower and in ascending through all four sections is freed from its contents of hydrogen sulphide. This cycle of absorption and regeneration is carried through three times, whereupon the two sections 1 and 2, after having taken up sulphur from the gas, are regenerated together by introducing air at the top of section 2. Following this operation the cycle afore described is repeated, gas and air being alternately supplied to section 1 only. Now regeneration of sections 1 and 2 is effected together and the cycle repeated once more. The 9th operation of purification is then followed by a regeneration of sections 1, 2 and 3, the air for purification being this time introduced at the the top of section 3. In other words: while section 1 is supplied with air for regeneration after each purification period, section 2 is regenerated only after 3 and section 3 only after 9 such periods.

This sequence of operations is illustrated in the diagram shown in Fig. 2 for two sequences of 9 periods each.

After the purification masses in the bottom section 1 have absorbed about 45% sulphur, they are removed, the bodies in the upper sections descending under the action of gravity, and the top sections being filled with fresh bodies.

*Example 2*

5 containers filled with purification bodies are traversed in series by a coke oven gas containing about 10 grams hydrogen sulphide per cubic metre, the velocity of flow of the gas being 20 millimetres per second. After the bodies in the first container of the row have absorbed a large quantity of sulphur, this container is stopped and the bodies therein are regenerated with air, whereupon the admission of gas to this container is resumed. This sequence of operations is repeated three times. In the fourth cycle of operations the second container is regenerated by cutting off the supply of gas and introducing air. Now the first container is regenerated three times in succession, before the second container is regenerated once. After two further regenerations the third container is now regenerated once and this cycle of operations is repeated as often as required, two regenerations of the second container and one regeneration of the third container being effected during each cycle of 6 regenerations of the first container. When the contents of sulphur of the purification mass in the first container has attained about 45%, the bodies are withdrawn from this container which is now charged with fresh purification bodies and is shifted to the end of the row, while fresh gas is now supplied to the hitherto second container.

*Example 3*

Into the first of a row of four containers, after it has absorbed a large quantiy of sulphur from the fresh gas introduced into it, gas is admitted, which has already passed through the second, third and fourth containers, air for regeneration being admixed to this gas, before it enters the container. On the second, now the first container having absorbed a large quantity of sulphur from fresh gas, it is treated in a similar manner, being supplied with gas, which has been freed from most of its hydrogen sulphide in the third, fourth and (original) first container, being at the same time regenerated by air admixed to the gas. The same cycle of operations is gone through with the third and fourth containers and so on. On the masses having absorbed the largest possible quantity of sulphur they are replaced by fresh masses.

Obviously this process can also be applied to purification plants operated under increased pressure.

Instead of air also mixtures of air and nitrogen or other gases substantially free from oxygen including gases of combustion, illuminating gas, producer gas etc. may be used for regeneration.

The duration of the purification and regeneration periods must be adjusted in accordance with the sulphur contents of the gas and the gas velocity.

Various changes may be made in the details disclosed in the foregoing specification without departing from the invention or sacrificing the advantages thereof.

I claim:—

1. In the purification of gases containing sulphur compounds, in which the gas is passed through a plurality of layers, arranged in series of molded bodies of a sulphur absorbing mass, and wherein the absorbed sulphur is set free by oxidation to regenerate the mass, the step of regenerating the first layer traversed by the fresh gas more frequently than the second layer.

2. In the purification of gases containing sulphur compounds, in which the gas is passed through a plurality of layers, arranged in series of molded bodies of a sulphur absorbing mass, and wherein the absorbed sulphur is set free by oxidation to regenerate the mass, the step of repeatedly regenerating the first layer, traversed by the fresh gas, by itself, thereafter once regenerating said first layer together with the second layer adjoining it, then repeatedly regenerating said first layer alone, thereafter regenerating same once together with said second layer and so on.

3. In the purification of gases containing sulphur compounds, in which the gas is passed through a plurality of layers, arranged in series of molded bodies of a sulphur absorbing mass and wherein the absorbed sulphur is set free by oxidation to regenerate the mass, the step of repeatedly regenerating the first layer, traversed by the fresh gas, by itself, thereafter once regenerating said first layer together with the second layer adjoining it, then repeatedly regenerating said first layer alone, thereafter regenerating same once together with said second layer and with the third layer, and so on.

4. In the purification of gases containing sulphur compounds, in which the gas is passed through a plurality of layers arranged in series, of molded bodies containing ferric hydroxide and the ferric sulphide formed by contact of the gas with said ferric hydroxide is regenerated and the sulphur set free by acting thereon with a gas containing oxygen, the step of regenerating the first layer traversed by the fresh gas more frequently than the second layer.

5. In the purification of gases containing sulphur compounds, in which the gas is passed through a plurality of layers of molded purification bodies capable of absorbing sulphur and arranged in superposition, the step of passing an oxidizing gas through the first layer adjoining the fresh gas admission more frequently than through the second layer traversed by gas partly freed from sulphur.

6. In the purification of gases containing sulphur compounds, in which the gas is passed through a plurality of layers of molded purification bodies capable of absorbing sulphur and arranged in superposition, the step of passing gas through all said layers, thereafter passing an oxidizing gas through the bottom layer only, repeating these two operations, thereafter passing fresh gas once more through all the layers, now passing air through the first and second layers and repeating this sequence of operations until the bottom layer has absorbed a large quantity of sulphur, removing said bottom layer and placing a layer of fresh purification mass on top of the top layer.

7. In the purification of gases containing sulphur compounds, in which the gas is passed through a plurality of layers, arranged in series, of molded bodies of a sulphur absorbing mass, and wherein the absorbed sulphur is set free by passing an oxidizing gas in contact with said bodies to regenerate the mass, the step of regenerating the first layer of the series of bodies more frequently than the second layer, and the second layer more frequently than the third.

8. The process of claim 7 in which the sulphur containing gas is passed through the layers of purification bodies in one, the oxidizing gas in the other direction.

9. The process of claim 7 in which the sulphur containing gas is passed through the layers of purification bodies in ascending, the oxidizing gas in descending direction.

10. The process of claim 1, wherein the first layer, on being substantially saturated with sulphur is connected as the last of the series and traversed by sulphur containing gas which has already passed through the other layers and to which an oxidizing gas has been admixed, and, after regeneration having taken place, is again connected as the first layer.

WALTHER SEXAUER.